United States Patent [19]

Abusleme et al.

[11] Patent Number: 6,096,795
[45] Date of Patent: *Aug. 1, 2000

[54] (CO) POLYMERIZATION PROCESS OF FLUORINATED OLEFINIC MONOMERS IN AQUEOUS EMULSION

[75] Inventors: Julio A. Abusleme, Saronno; Pier Antonio Guarda, Nole, both of Italy; Ralph J. De Pasquale, S. Augustine Beach, Fla.

[73] Assignee: Auismont S.p.A., Italy

[*] Notice: This patent issued on a continued prosecution application filed under 37 CFR 1.53(d), and is subject to the twenty year patent term provisions of 35 U.S.C. 154(a)(2).

[21] Appl. No.: 08/772,865

[22] Filed: Dec. 26, 1996

Related U.S. Application Data

[63] Continuation of application No. 08/332,748, Nov. 1, 1994, abandoned.

[30] Foreign Application Priority Data

Nov. 2, 1993 [IT] Italy .................. MI93A2317

[51] Int. Cl.[7] ................ C08F 2/50; C08F 2/24; C08J 3/28
[52] U.S. Cl. ................ 522/33; 522/60; 522/63; 522/66; 522/67; 522/55; 522/84; 522/85
[58] Field of Search .................. 522/60, 187, 181, 522/84, 55, 85, 66, 67, 63, 33

[56] References Cited

U.S. PATENT DOCUMENTS

| | | | |
|---|---|---|---|
| 2,559,752 | 7/1951 | Berry | 522/84 |
| 2,600,202 | 6/1952 | Caird | 522/60 |
| 2,912,373 | 11/1959 | Carlson | 204/163 |
| 2,978,396 | 4/1961 | Shewmaker et al. | 522/189 |
| 3,467,635 | 9/1969 | Brasen et al. | 260/80.76 |
| 3,624,250 | 11/1971 | Cartoon | 260/80.75 |
| 3,865,845 | 2/1975 | Resnick | 260/340.9 |
| 3,892,641 | 7/1975 | Tabata et al. | 204/159.22 |
| 3,933,773 | 1/1976 | Foerster | 522/156 |
| 3,941,671 | 3/1976 | Machi et al. | 522/84 |
| 3,978,030 | 8/1976 | Resnick | 526/247 |
| 4,151,340 | 4/1979 | Ichimura et al. | 526/249 |
| 4,166,165 | 8/1979 | Hisasue et al. | 522/181 |
| 4,243,770 | 1/1981 | Tatemoto et al. | 525/331 |
| 4,486,579 | 12/1984 | Machon et al. | 526/65 |
| 4,513,129 | 4/1985 | Nakagawa et al. | 526/249 |
| 4,675,380 | 6/1987 | Buckmaster et al. | 528/481 |
| 4,694,045 | 9/1987 | Moore | 525/276 |
| 4,789,717 | 12/1988 | Giannetti et al. | 526/209 |
| 4,864,006 | 9/1989 | Giannetti et al. | 526/209 |
| 4,973,633 | 11/1990 | Moore | 526/247 |
| 5,087,679 | 2/1992 | Inukai et al. | 526/249 |

FOREIGN PATENT DOCUMENTS

| | | |
|---|---|---|
| 0073087 | 3/1983 | European Pat. Off. . |
| 0076581 | 4/1983 | European Pat. Off. . |
| 0080187 | 6/1983 | European Pat. Off. . |
| 0407937 | 1/1991 | European Pat. Off. . |
| 0518073 | 12/1992 | European Pat. Off. . |
| 0617058 | 9/1994 | European Pat. Off. . |
| 0625526 | 11/1994 | European Pat. Off. . |
| 0633257 | 1/1995 | European Pat. Off. . |
| 0633274 | 1/1995 | European Pat. Off. . |
| 2 378 806 | 8/1978 | France . |
| 1146188 | 3/1969 | United Kingdom ........... 522/60 |

*Primary Examiner*—Susan W. Berman
*Attorney, Agent, or Firm*—Bell, Boyd & Lloyd

[57] ABSTRACT

This invention relates fluorinated polymers having high structural regularity, characterized by a high maximum operating temperature and by improved mechanical and processability properties, prepared by a (co)polymerization process of fluorinated olefinic monomers, optionally in association with non-fluorinated olefins, in aqueous emulsion, in the presence of radical photoinitiators and of ultraviolet-visible radiation.

39 Claims, No Drawings

(CO) POLYMERIZATION PROCESS OF FLUORINATED OLEFINIC MONOMERS IN AQUEOUS EMULSION

This is a continuation of co-pending application Ser. No. 08/332,748, filed on Nov. 1, 1994, now abandoned.

FIELD OF THE INVENTION

The present invention relates to a (co)polymerization process of fluorinated olefinic monomers in aqueous emulsion, which allows to obtain products having high structural regularity, characterized by a high maximum operating temperature and by improved mechanical and processability properties.

BACKGROUND OF THE INVENTION

Among the known techniques for the (co)polymerization of fluorinated olefinic monomers, optionally in association with non-fluorinated olefins, the most widely used, also on an industrial scale, are those in aqueous emulsion and in suspension, in the presence of radical initiators.

In the case of emulsion (co)polymerization, the polymer is produced in the form of particles dispersed in an aqueous medium by a suitable surfactant. This allows to dissipate the reaction heat very efficiently, hence achieving a good control of reaction temperature and thus a high productivity. Moreover, the absence of organic solvents implies lower process costs and lower environmental impact.

The aqueous emulsion technique shows, however, some drawbacks due to the reaction conditions required. In fact, the use of radical initiators which decompose thermally makes necessary to adopt relatively high reaction temperatures, ranging from at least 50° C. even to 150° C. Polymerization temperatures of this kind negatively influence the characteristics of the final product, in particular they cause a lowering of the second melting temperature and therefore a limitation in the maximum operating temperature of the polymer (the so called "rating temperature").

Such an inconvenience is particularly evident in the case of partially hydrogenated polymers. For instance, it is known that vinylidene fluoride homopolymer shows much more defects of monomeric inversion as far as the polymerization temperature is higher. The increase of such defects leads to a decrease of the crystallinity percentage and thus of the second melting temperature, which, as known, determines the maximum operating temperature of the product. Similarly, for ethylene/tetrafluoroethylene copolymers and especially ethylene/chlorotrifluoroethylene copolymers, an increase in the polymerization temperature implies a drastic decrease in comonomer alternation, with formation of blocks which worsen both mechanical performances and thermal stability of the product. This fact explains why the emulsion (co)polymerization technique is not used for the synthesis of ethylene/chlorotrifluoroethylene copolymers, for which suspension technique at a temperature lower than 25° C. is used instead.

For the time being, the only available technique to lower the polymerization temperature still using the emulsion reaction is generating radicals by redox systems. In the case of fluorinated polymers, however, such technique leads to unsatisfactory results, since it causes formation both of great fractions with low molecular weight and of molecules having polar end-groups, which cause discolouration of the polymer and/or favour dehydrohalogenation, with disastrous consequences on the product quality.

A further drawback of the aqueous emulsion polymerization technique is the need of working at high pressures, generally around 25 bar or even up to 90 bar, with evident drawbacks in plant design. Such high pressures are necessary to increase concentration in the reaction medium of fluorinated monomers, scarcely soluble in the aqueous phase. In such a way it is tried to avoid, as much as possible, the formation of fractions having low molecular weight, which negatively affect mechanical properties of the final product. It is indeed known that, to obtain a good control of molecular weight distribution, it is necessary to reach an optimal balance between concentration of radicals generated by the initiator and concentration of the monomers in the reaction site. Because of the scarce solubility of monomers in the reaction medium, it is therefore necessary to increase the reaction pressure and contemporaneously to carefully dose the initiator, without unacceptably jeopardizing, however, the process productivity.

As regards suspension polymerization of fluorinated olefinic monomers, it allows to employ reaction pressures lower than those necessary for emulsion technique, since monomer solubility in the reaction medium, usually formed by organic solvents such as chlorofluorocarbons, is sufficiently high. The use of organic solvents constitutes, however, a remarkable drawback from a plant viewpoint and implies problems of environmental impact, especially when chlorofluorocarbons are employed.

With respect to emulsion polymerization, by means of suspension technique it is also possible to lower reaction temperature, provided that an initiator active at low temperatures is available. Besides the difficulty of finding for each type of fluorinated polymer such an initiator, in any event it is necessary to adopt particular safety measures, both for synthesis and for shipping and storage, since they are extremely hazardous products, being explosive also at low temperatures. Moreover, such initiators must often be diluted in solvents to avoid an accelerated explosive decomposition.

DESCRIPTION OF THE INVENTION

The Applicant has now surprisingly found that it is possible to obtain fluorinated (co)polymers having high structural regularity, characterized by a high maximum operating temperature (rating temperature) and by improved mechanical and processability properties, by means of a (co)polymerization process of fluorinated olefinic monomers, optionally in association with non-fluorinated olefins, in aqueous emulsion, in the presence of radical photoinitiators and of ultraviolet-visible radiation. In such a way, it is therefore possible, in comparison to emulsion technique of the known art, to work at low pressures and low temperatures, without employing organic solvents and hazardous initiators.

Therefore, object of the present invention is a process for (co)polymerizing one or more fluorinated olefinic monomers, optionally in association with one or more non-fluorinated olef ins, wherein said monomers are (co)polymerized in aqueous emulsion in the presence of a radical photoinitiator and of ultraviolet-visible radiation.

By "radical photoinitiators" it is meant all of the chemical species, either soluble or insoluble in water, which, when submitted to UV-visible radiation, generate radicals capable of initiating (co)polymerization of fluorinated olefinic monomers. Among them, there are comprised: inorganic peroxides, for instance alkali metal (preferably potassium or sodium) persulphate or ammonium persulphate; organic peroxides; ketones, for instance, acetone; di- or polyketones, for instance biacetyl; dialkylsulphides, for instance dimethylsulphide; transition metal complexes, for instance pentamino-chloro-cobalt (III) [Co(NH$_3$)$_5$Cl$_2$]$^{2+}$; halogenated or polyhalogenated organic compounds, for instance alkylhalides R—X, where R is an alkyl C$_1$–C$_{10}$, and X is preferably Br or I.

Among the organic peroxides, particularly preferred are: dialkylperoxides, such as diterbutylperoxide; acylperoxides, such as diacetylperoxide; peroxycarbonates, such as bis(4-terbutylcyclohexyl)peroxydicarbonate; peroxyesters, for instance terbutylperoxyisobutyrate.

From an operative viewpoint, photoinitiators thermally stable at the polymerization temperature and also at room temperature are preferred, and among them organic or inorganic peroxides, such as potassium persulphate, ammonium persulphate and diterbutylperoxiode, are particularly preferred.

With respect to the processes known in the art, the process object of the present invention allows to select the initiator within a very wide range. This is an outstanding advantage especially in the case of partially hydrogenated (co)polymers, such as polyvinylidenfluoride or copolymers of ethylene with tetrafluoroethylene or chlorotrifluoroethylene, whose thermochemical stability strongly depends on the nature of chain end-groups deriving from the initiator. Therefore, it is possible to employ initiators, generally unsuitable with the methods known until now, which give particularly stable end-groups. That is the case, for instance, of diterbutyl-peroxide and of acetone, which give methyl end-groups.

As regards UV-visible radiation, it is provided to the reaction system by means of a suitable emission source, according to conventional techniques commonly employed for photochemical reactions, for instance by means of a high pressure mercury lamp. The UV-visible radiation wavelength suitable for the process object of the present invention is generally comprised between 220 and 600 nm. It is to be pointed out that using radiation for generating radicals generally allows a better control of the reaction kinetics, and in particular, in the case of polymerization runaway, it is possible to deactivate immediately the radiation source and therefore to stop the reaction; this is clearly impossible when thermal initiators are employed.

As described above, in comparison with emulsion technique known in the art, one of the most evident advantages of the process object of the present invention is the possibility of operating within a wide temperature range, generally comprised from −20° to +100° C., preferably from −10° to +40° C. We would like to stress that it is possible to operate at temperatures lower than 0° C. by modifying in a suitable manner the characteristics of aqueous phase, for instance by increasing ionic strength and/or by adding a co-solvent.

A further advantage with respect to conventional emulsion technique is the possibility of working at low pressures. In fact, the reaction pressure can generally range from 3 to 50 bar, preferably from 10 to 20 bar.

As known, the emulsion technique requires also the presence of surfactants. Among the various kinds of surfactants employable in the process of the present invention, we can cite in particular the products of formula:

$$R_fX^-M^+$$

where $R_f$ is a (per)fluoroalkyl chain C$_5$–C$_{16}$ or a (per)fluoropolyoxyalkylene chain, X$^-$ is —COO$^-$ or —SO$_3^-$, M$^+$ is selected from: H$^+$, NH$_4^+$, alkali metal ion. Among those more commonly used we cite: ammonium perfluorooctanoate, (per)fluoropolyoxyalkylenes end-capped with one or more carboxyl groups, etc.

To the reaction mixture chain transfer agents can also be added, such as: hydrogen; hydrocarbons or fluorohydrocarbons (for instance methane or ethane); ethyl acetate; diethylmalonate. It is also possible to employ as chain transfer agent hydrogen or an aliphatic hydrocarbon or fluorohydrocarbon in association with an aliphatic alcohol with branched chain, as described in Italian patent application No. MI 93A/000551 which corresponds to U.S. Pat. No. 5,516,863, filed Mar. 21, 1994, and to EP-A-617,058, published Sept. 28, 1994 in the name of the Applicant.

The process object of the present invention can be advantageously carried out in the presence of emulsions or microemulsions of perfluoropolyoxyalkylenes, as described in patents U.S. Pat. No. 4,789,717 and U.S. Pat. No. 4,864,006, or also of microemulsions of fluoropolyoxyalkylenes having hydrogen-containing end-groups and/or hydrogen-containing repetitive units, according to what described in Italian patent application No. MI 93A/001007 which corresponds to U.S. Pat. No. 5,4998,680, filed May 16, 1994, and to EP-A-625,526, published Nov. 23, 1994 in the name of the Applicant.

Such fluoropolyoxyalkylenes are constituted by repetitive units, randomly distributed along the chain, selected from:

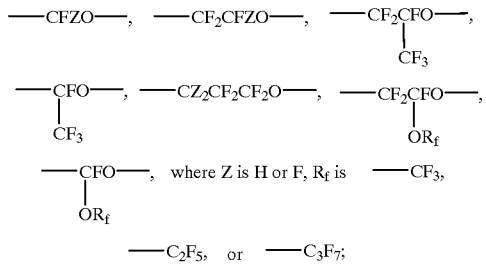

and by hydrogenated end grounds selected from —CF$_2$H, —CF$_2$CF$_2$H, —CFH—CF$_3$, and —CFH—OR$_f$, where R$_f$ is defined as above, or perfluorinated end groups selected from —CF$_3$, —C$_2$F$_5$ and —C$_3$F$_7$, at least one of the end groups being hydrogenated.

The average molecular weight is generally comprised between 300 and 4000, preferably between 400 and 1500.

In particular, such fluoropolyoxyalkylenes can be selected from the following classes:

(a)

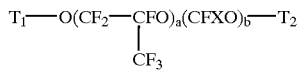

(CFXO)$_b$-T$_2$
where:
T$_1$ and T$_2$, equal or different from each other, are hydrogenated groups —CF$_2$H, —CFH—CF$_3$, or perfluorinated groups —CF$_3$, —C$_2$F$_5$, —C$_3$F$_7$, at least one of the end groups being hydrogenated; X is —F or —CF$_3$; a, b are numbers such that the molecular weight is comprised in the range indicated above, a/b is comprised between 5 and 15;

(b) T$_3$—O(CF$_2$CF$_2$O)$_c$(CF$_2$O)$_d$—T$_4$
where:
T$_3$ and T$_4$, equal or different from each other, are hydrogenated groups —CF$_2$H or —CF$_2$—CF$_2$H, or perfluorinated groups —CF$_3$, —C$_2$F$_5$, at least one of the end groups being hydrogenated; c, d are numbers such that the molecular weight is comprised in the range indicated above, c/d is comprised between 0.3 and 5;

(c)

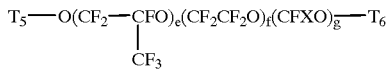

(CF$_2$CF$_2$O)$_f$(CFXO)$_g$-T$_6$ where:

T$_5$ and T$_6$, equal or different from each other, are hydrogenated groups —CF$_2$H, —CF$_2$CF$_2$H, or —CFH—CF$_3$, or perfluorinated groups —CF$_3$, —C$_2$F$_5$, —C$_3$F$_7$, at least one of the end groups being hydrogenated; X is —F or —CF$_3$; e, f, g are numbers such that the molecular weight is comprised in the range indicated above, e/(f+g) is comprised between 1 and 10, f/g is comprised between 1 and 10;

(d)

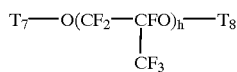

-t$_8$ where:

T$_7$ and T$_8$ are hydrogenated groups —CFH—CF$_3$, or per-fluorinated groups —C$_2$F$_5$, —C$_3$F$_7$, at least one of the end groups being hydrogenated; h is a number such that the molecular weight is comprised in the range indicated above;

(e) T$_9$—O(CZ$_2$CF$_2$CF$_2$O)$_i$—T$_{10}$ where: Z is F or H; T$_9$ and T$_{10}$, equal or different from each other, are hydrogenated groups —CF$_2$H or —CF$_2$CF$_2$H, or perfluorinated groups —CF$_3$, —C$_2$F$_5$, —C$_3$F$_7$, at least one of the end groups being hydrogenated; i is a number such that the molecular weight is comprised in the range indicated above;

(f)

where:

R$_f$ is —CF$_3$, —C$_2$F$_5$, or —C$_4$F$_7$; T$_{11}$ and T$_{12}$, equal or different from each other, are hydrogenated groups —CF$_2$H, —CF$_2$CF$_2$H, —CFH—OR$_f$, or perfluorinated groups —CF$_3$, —C$_2$F$_5$, —C$_3$F$_7$, at least one of the end groups being hydrogenated; j, k, l are numbers such that the molecular weight is comprised in the range indicated above, k+l and j+k+l are at least equal to 2, k/(j+l) is comprised between 10$^{-2}$ and 10$^3$, l/j is comprised between 10$^{-2}$ and 10$^2$;

(g)

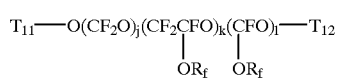

where:

T$_{13}$ and T$_{14}$, equal or different from each other, are hydrogenated groups —CF$_2$H, —CFH—CF$_3$, or per-fluorinated groups —CF$_3$, —C$_2$F$_5$, —C$_3$F$_7$, at least one of the end groups being hydrogenated; X is —F or —CF$_3$; m, n, o, p are numbers such that the molecular weight is comprised in the range indicated above, m/n is comprised between 5 and 40, m/(o+p) is comprised between 2 and 50, o+p is at least 3, o is lower than p;

(h) T$_{15}$—O(CF$_2$CF$_2$O)$_q$(CF$_2$O)$_r$(CFHO)$_s$(CF$_2$CFHO)$_t$—T$_{16}$ where:

T$_{15}$ and T$_{16}$, equal or different from each other, are hydrogenated groups —CF$_2$H, —CF$_2$—CF$_2$H, or perfluorinated groups —CF$_3$, —C$_2$F$_5$, at least one of the end groups being hydrogenated; q, r, s, t are numbers such that the molecular weight is comprised in the range indicated above, q/r is comprised between 0.5 and 2, (q+r)/(s+t) is comprised between 3 and 40, s+t is at least 3, s is lower than t;

(i)

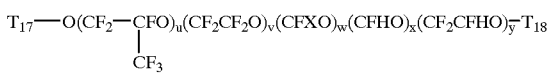

(CF$_2$CF$_2$O)$_v$(CFXO)$_w$(CFHO)$_x$)(CF$_2$CFHO)$_y$-T$_{18}$ where:

T$_{17}$ and T$_{18}$, equal or different from each other, are hydrogenated groups —CF$_2$H, —CF$_2$CF$_2$H, —CFH—CF$_3$, or perfluorinated groups —CF$_3$, —C$_2$F$_5$, —C$_3$F$_7$, at least one of the end groups being hydrogenated: X is —F or —CF$_3$; u, v, w, x, y are numbers such that the molecular weight is comprised in the range indicated above, (u+v)/w is comprised between 5 and 40, (u+v)/(x+y) is comprised between 2 and 50, x+y is at least 3, x is lower than y.

They are products obtainable by hydrolysis and subsequent decarboxylation of the —COF groups present in the corresponding perfluoropolyoxyalkylenes, as described for instance in the patents EP-154,297, U.S. Pat. No. 4,451,646 and U.S. Pat. No. 5,091,589.

The starting perfluoropolyethers containing the —COF groups as end groups and/or along the chain are described, for instance, in the patents GB-1,104,482 (class (a)), U.S. Pat. No. 3,715,378 (class (b)), U.S. Pat. No. 3,242,218 (class (c)), U.S. Pat. No. 3,242,218 (class (d)), EP-148,482 (class (e)), EP-445,738 (class (f)), EP-244,839 and EP-337,346 (classes (g), (h), (i)).

The process object of the present invention can be employed with all the types of fluorinated olefinic monomers, optionally containing hydrogen and/or chlorine and/or bromine and/or oxygen, provided that they are able to give (co)polymers by reaction with radical initiators in aqueous emulsion. Among them we can cite: perfluoroolefins C$_2$–C$_8$, such as tetrafluoroethylene (TFE), hexafluoropropene (HFP), hexafluoroisobutene; hydrogen-containing fluoroolefins C$_2$–C$_8$, such as vinyl fluoride (VF), vinylidene fluoride (VDF), trifluoroethylene, perfluoroalkylethylene CH$_2$=CH—R$_f$, where R$_f$ is a perfluoroalkyl C$_1$–C$_6$; chloro- and/or bromo-fluoroolefins C$_2$–C$_8$, such as chlorotrifluoroethylene (CTFE) and bromotri-fluoroethylene; perfluorovinylethers CF$_2$=CFOX, where X is a perfluoroalkyl C$_1$–C$_6$, for instance trifluoromethyl or pentafluoropropyl, or a perfluorooxyalkyl C$_1$–C$_9$ having one or more ether groups, for instance perfluoro-2-propoxy-propyl; perfluorodioxols.

The fluoroolefins can also be copolymerized with non-fluorinated olefins C$_2$–C$_8$, such as ethylene, propylene, isobutylene.

Among the polymers to which the process object of the present invention is applicable, there are particularly comprised:

(a) polytetrafluoroethylene or modified polytetrafluoroethylene containing small amounts, generally comprised between 0.1 and 3% by mols, preferably lower than 0.5% by mols, of one or more comonomers such as, for instance: perfluoropropene, perfluoroalkylvinylethers, vinylidene fluoride, hexafluoroisobutene, chlorotrifluoroethylene, perfluoroalkylethylene;

(b) thermoplastic TFE polymers containing from 0.5 to 8% by mols of at least one perfluoroalkylvinylether, where the alkyl has from 1 to 6 carbon atoms, such as, for instance, TFE/perfluoropropylvinylether copolymers, TFE/perfluoromethylvinylether copolymers, TFE/perfluoroalkylethylene copolymers, TFE/perfluoromethylvinylether polymers modified with another perfluorinated comonomer (as described in European Patent Application No. 94109780.0) which corresponds to U.S. Pat. No. 5,463,006, filed Jul. 1, 1994, and to EP-A-633,274, published Jan. 11, 1995;

(c) thermoplastic TFE polymers containing from 2 to 20% by mols of a perfluoroolefin $C_3$-$C_8$, such as, for instance, FEP (TFE/HFP copolymer), to which other comonomers having vinylether structure can be added in small amounts (lower than 5% by mols) (see for instance U.S. Pat. No. 4,675,380);

(d) TFE or CTFE copolymers with ethylene, propylene or isobutylene, optionally containing a third fluorinated comonomer, for instance a perfluoroalkylvinylether, in amounts comprised between 0.1 and 10% by mols (see for instance the U.S. Pat. Nos. 3,624,250 and 4,513,129);

(e) elastomeric TFE copolymers with a perfluoroalkylvinylether or perfluorooxyalkylvinylether; optionally containing propylene or ethylene, besides lower amounts of a "cure-site" monomer (see for instance U.S. Pat. Nos. 3,467,635 and 4,694,045);

(f) polymers with dielectric properties, comprising 60–79% by mols of VDF, 18–22% by mols of trifluoroethylene and 3–22% by mols of CTFE (see U.S. Pat. No. 5,087,679);

(g) elastomeric VDF polymers, such as VDF/HFP copolymers and VDF/HFP/TFE terpolymers (see, for instance, GB Patent 888,765 and Kirk-Othmer, "Encyclopedia of Chemical Technology", Vol. 8, pag. 500–515—1979); such polymers can also contain: hydrogenated olefins, such as ethylene or propylene (as described for instance in EP 518,073); perfluoroalkylvinylethers; "cure-site" brominated comonomers and/or end iodine atoms, according to what described, for instance, in U.S. Pat. No. 4,243,770, U.S. Pat. No. 4,973,633 and EP 407,937.

(h) polyvinylidenfluoride or modified polyvinylidenfluoride containing small amounts, generally comprised between 0.1 and 10% by mols, of one or more fluorinated comonomers, such as hexafluoropropene, tetrafluoroethylene, trifluoroethylene.

The polymers of the classes indicated above, and particularly TFE-based polymers, can be modified with perfluorinated dioxols, according to what is described for instance in patents U.S. Pat. No. 3,865,845, U.S. Pat. No. 3,978,030, EP-73,087, EP-76,581, EP-80,187, and in European Patent Application No. 94109782.6 which corresponds to U.S. Pat. No. 5,495,028, filed Jul. 1, 1994 and to EP-A-633,257, published Jan. 11, 1995.

The process object of the present invention is preferably employed for the (co)polymerization of hydrogen-containing fluorinated monomers, such as for instance VDF (see classes (g) and (h) described above), or for the copolymerization of perfluorinated olefinic monomers with non fluorinated olefins (see for instance class (d)).

EXAMPLE

Some working examples are reported hereinbelow, whose purpose is merely illustrative but not limitative of the scope of the invention.

Example 1

On the lateral wall of a 0.6 l AISI 316 stainless steel autoclave, equipped with a stirrer working at 600 rpm, a quartz window was inserted, in correspondence of which an UV lamp of type Hanau[R] TQ-150 was installed. It is a high pressure mercury lamp emitting radiation comprised from 240 to 600 nm, with a power of 13.2 W for radiation from 240 to 330 nm.

The autoclave was evacuated and there were introduced in sequence:

350 g of demineralized $H_2O$, devoid of $O_2$;

4.2 g of a microemulsion consisting of: 12% by weight of Galden® D02, of the formula $CF_3O$—$(CF_2$—$CF(CF_3)O)_m(CF_2O)_n$—$CF_3$ having m/n=20 and an average molecular weight of 450; 36% by weight of a surfactant of the formula: $CF_3O$—$(CF_2$—$CF(CF_3)O)_m(CF_2O)_n$—$CF_2COO^-$ $K^+$ having m/n=26.2 and an average moelcular weight of 580; the remainder being $H_2O$;

1 g of potassium persulphate (KPS).

The autoclave was then brought to 15° C. and to a pressure of 25 bar with vinylidenfluoride (VDF). The UV lamp was then switched on. After 5 minutes the starting of the reaction was observed, revealed by a decrease in the pressure inside the autoclave. The initial pressure was restored and kept constant for the whole reaction duration by continuously feeding VDF. After 28 minutes from the reaction start, the lamp was switched off and the autoclave vented and discharged at room temperature. The so obtained latex was coagulated and dried, yielding 20.94 g of a polymer which was characterized as follows:

second melting temperature ($T_{2m}$): by differential scanning calorimetry (DSC);

Melt Flow Index (MFI): according to ASTM D 3222-88 Standard;

tail-to-tail and head-to-head inversions (% by mols) according to known techniques, by $^{19}$F-NMR analysis.

The results are reported in Table 1, where the process productivity ($R_p$) is also indicated, expressed as polymer grams per minute per liter of water.

Example 2

The same conditions and procedures of Example 1 were followed, except for the type of microemulsion and initiator. There were indeed employed 4.2 g of a microemulsion consisting of: 24% by weight of a perfluoropolyoxyalkylene having hydrogen-containing end-groups of formula $CF_2H$—$O$—$(CF_2CF_2O)_m$—$(CF_2O)_n$—$CF_2H$ having m/n=0.95 and an average molecular weight of 365; 33% by weight of a surfactant of formula: $CF_3O$—$(CF_2CF(CF_3)O)_m(CF_2O)_n$—$CF_2COO^-$ $K^+$ having m/n=26.2 and an average molecular weight of 580; the remainder being $H_2O$. As initiator diterbutylperoxide (DTBP) was used, fed in portions of 0.5 ml each 5 minutes, for a total amount of 6 ml. The polymerization was carried out for 60 minutes. The lamp was then switched off and the autoclave vented and discharged at room temperature. The resulting latex was coagulated and dried The obtained polymer (25.0 g) was characterized according to what reported in Table 1.

Example 3 (comparative)

A 5 l AISI 316 steel chromated autoclave, equipped with a stirrer working at 570 rpm, was evacuated and there were introduced in sequence: 15 g of a paraffin wax (melting point about 66° C.), 3.5 l of demineralized $H_2O$ and 7 g of Surflon® S-111-S as surfactant. The autoclave was then brought to the reaction temperature of 122.5° C. and to a pressure of 44 absolute bar with the monomer (VDF), keeping such pressure constant during the polymerization. When the reaction conditions were reached, 17 ml of diterbutylperoxide (DTBP) were added.

The reaction started after 8 minutes and was stopped after 224.5 minutes by cooling the autoclave down to room temperature. The so obtained latex was coagulated and dried. The resulting polymer (1230 g) was characterized according to what reported in Table 1.

Example 4

The same autoclave of Example 1, equipped with a stirrer working at 1000 rpm, with the quartz window and the UV lamp, was evacuated and there were introduced in sequence:

310 g of demineralized $H_2O$, devoid of $O_2$;

2 g of a surfactant of formula $CF_3O-(CF_2-CF(CF_3)O)_m-(CF_2O)_n-CF_2COO^- K^+$ having m/n=26.2 and an average molecular weight of 595.

The autoclave was then brought to 5° C. and there were charged 6.8 bar of tetrafluoroethylene (TFE) and 3.2 bar of the feeding mixture, consisting of 49% by mols of ethylene (ET) and 51% by mols of TFE. The UV lamp was then switched on and an aqueous solution of KPS was fed continuously, with a flow rate of 0.0246 g KPS/hour, up to a total amount of KPS equal to 0.039 g. The reaction started after 21 minutes. The pressure was kept constant by feeding the above ET/TFE mixture. After overall 263 minutes of reaction, the lamp was switched off and the autoclave vented and discharged at room temperature. The resulting latex was coagulated and dried. The obtained polymer (50.0 g) was characterized according to what reported in Table 1. The Melt Flow Index was determined according to ASTM D3159–83 standard.

Example 5

The autoclave as described in Example 4 was evacuated and there were introduced in sequence:

240 g of demineralized $H_2O$, devoid of $O_2$;

6.1 g of the microemulsion used in Example 2.

The autoclave was brought to 10° C. and there were charged 7 bar of TFE and 8 bar of a feeding mixture consisting of 49% by mols of ET and 51% by mols of TFE. The UV lamp was then switched on and contemporaneously a solution of diterbutylperoxide (DTBP) in terbutanol was continuously fed, with a flow rate of 0.0042 g DTBP/hour, for 60 minutes. The reaction started after 15 minutes. The pressure was kept constant by feeding the above mixture ET/TFE. After overall 493 minutes of reaction, the lamp was switched off and the autoclave vented and discharged at room temperature. The resulting latex was coagulated and dried. The obtained polymer (40.0 g) was characterized according to what reported in Table 1.

Example 6

The same conditions and procedures of Example 5 were followed, except for the type of initiator. Acetone was indeed used, fed in 0.5 ml portions each 5 minutes, for a total amount of 6 ml. The polymerization was carried out for 60 minutes. The lamp was then switched off and the autoclave vented and discharged at room temperature. The resulting latex was coagulated and dried. The obtained polymer (25.0 g) was characterized according to what reported in Table 1.

Example 7 (comparative)

A 5 l AISI 316 steel chromated autoclave, equipped with a stirrer working at 570 rpm, was evacuated and there were introduced in sequence: 225 ml of CFC-113; 37.5 g of Galden$^{(R)}$ surfactant of formula $CF_3O-(CF_2CF(CF_3)O)_m-(CF_2O)_n-CF_2COO^- NH_4^+$ having m/n=10 and an average molecular weight of about 600, dissolved in 575 ml of demineralized water. The autoclave was then brought to the reaction temperature of 75° C. and charged with ET and TFE in such amounts to obtain, at the working pressure of 22 absolute bar, a molar ratio ET/TFE in the gas phase equal to 18/82. When the working pressure was reached, a solution of ammonium persulphate (APS) (5 g APS/l) were continuously fed for 6 hours with a flow rate of 25 ml/hour. The working pressure was kept constant by feeding during the reaction a mixture ET/TFE in molar ratio 45/55. After 6 hours of reaction 3.848 kg of latex having a concentration equal to 119 g of polymer per kg of latex were discharged. The latex was coagulated and dried, and the resulting polymer was characterized according to what reported in Table 1.

Example 8

The same autoclave used in Example 4 was evacuated and there were introduced in sequence:

275 g of demineralized $H_2O$, devoid of $O_2$;

2.3 g of a microemulsion consisting of: 18.4% by weight of Galden® D02, of formula $CF_3O-(CF_2CF(CF_3)O)_m(CF_2O)_n-CF_3$ having m/n=20 and an average molecualr weight of 450; 30.6% by weight of a surfactant of formula: $CF_3O-(CF_2CF(CF_3)O)_m(CF_2O)_n-CF_2COO^- NH_4^+$ having m/n=10 and an average molecular weight of 684; the remainder being $H_2O$; 0.0035 g of potassium persulphate (KPS).

The autoclave was then brought to 15° C. and to a pressure of 10 bar with a mixture consisting of 98.2% by mols of TFE and 1.8% by mols of perfluoropropylvinylether (FPVE). Then the UV lamp was switched on and contemporaneously an aqueous solution of KPS was fed continuously for 1 hour, with a flow rate of 0.007 g KPS/hour. After 1 minute the reaction start was observed. The working pressure was kept constant for the overall duration of the reaction by continuously feeding the above mixture TFE/FPVE. After 146 minutes from the reaction start, the lamp was switched off and the autoclave vented and discharged at room temperature. The resulting latex was coagulated and dried. The obtained polymer (76.0 g) was characterized according to what reported in Table 1. The Melt Flow Index was determined according to ASTM D 3307-86 Standard.

Example 9

The same autoclave of Example 4 was evacuated and there were introduced 310 g of demineralized $H_2O$, devoid of $O_2$. The autoclave was brought to 15° C. and 2.7 bar of hexafluoropropene (HFP) and then 7.3 bar of the feeding mixture, consisting of 78.5% by mols of VDF and 21.5% by mols of HFP, were charged. The UV lamp was then switched on and contemporaneously an aqueous solution of APS was fed continuously for 1 hour, with a flow rate of 0.7 g APS/hour. The reaction started after 42 minutes. The pressure was kept constant by continuously feeding the above mixture VDF/HFP. After overall 111 minutes of reaction, the lamp was switched off and the autoclave vented and discharged at room temperature. A latex was so obtained, which was coagulated and dried. The obtained polymer (45.0 g) was characterized according to what reported in Table 1. The glass transition temperature ($T_g$) was determined by DSC, the weight average molecular weight ($M_w$) by Gel Permeation Chromatography (GPC).

Example 10 (comparative)

A 5 l AISI 316 steel chromated autoclave, equipped with a stirrer working at 630 rpm, was evacuated and 3.4 l of demineralized water were introduced. The autoclave was then brought to the reaction temperature of 85° C. and charged with VDF and hexafluoropropene (HFP) in such amounts to obtain, at the working pressure of 11 absolute bar, a molar ratio VDF/HFP in the gas phase equal to 53/47. When the working pressure was reached, 26.25 g of APS dissolved in 100 ml of demineralized $H_2O$ were introduced. The working pressure was kept constant during the reaction by feeding a gaseous mixture VDF/HFP in molar ratio ratio 78.5/21.5. After 61 minutes the reaction was stopped and the latex was discharged, which, coagulated and dried, provided 1454 g of polymer. The latter was characterized according to what reported in Table 1.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:
1. A process for (co)polymerizing at least one fluorinated olefinic monomer(s), optionally in association with at least one nonfluorinated olefin, comprising (co)polymerizing said monomer(s) in an aqueous emulsion containing a surfactant and in the presence of a radical photoinitiator selected from the group consisting of inorganic peroxides, organic peroxides, ketones, dialkylsulphides, transition metal complexes, and halogenated organic compounds, and in the presence of a radiation ranging from ultraviolet to visible and having a wavelength ranging from 220 nm to 600 nm, wherein the reaction temperature is from −20° C. to +100° C., and wherein the reaction pressure is from 3 to 50 bar.
2. Process according to claim 1, wherein the radical photoinitiator is an organic peroxide selected from the ground consisting of dialkylperoxides; acylperoxides; peroxycarbonates; and peroxyesters.
3. Process according to claim 2, wherein the radical photoinitiator is diterbutylperoxide.
4. The process of claim 1, wherein a fluorinated olefinic monomer is a hydrogen containing fluorinated monomer.
5. The process of claim 1, wherein the ketones are selected from di- or polyketones.
6. The process of claim 1, wherein the organic halogenated compound is polyhalogenated.
7. A process for (co)polymerizing at least one fluorinated olefinic monomer, optionally in association with at least one non-fluorinated olefin, comprising:
   (co)polymerizing said monomer(s) in an aqueous emulsion containing a surfactant and in the presence of a radical photoinitiator selected from the group consisting of alkali metal persulphate, ammonium persulphate, dialkyperoxides, acylperoxides, peroxycarbonates, peroxyesters and dialkylsulphides;
   without an organic solvent, and at a reaction temperature of from −20° C. to +100° C., and a pressure is from 3 to 50 bar; and
   in the presence of a radiation ranging from ultraviolet to visible and having a wavelength ranging from 220 nm to 600 nm;
   said radiation being used to control reaction kinetics wherein in the event of polymerization runaway, the

TABLE 1

| EX. | POLYMER COMPOSITION (% mols) | | INITIATOR | REACTION CONDITIONS | | | | | |
|---|---|---|---|---|---|---|---|---|---|
| | | | | T (° C.) | p (bar) | $R_p$ (g/l · min) | $T_{2m}$ (° C.) | MFI (g/10') | INVERSIONS (% moli) |
| 1 | VDF | 100% | KPS | 15 | 25 | 1.81 | 174.4 | s.f. | 3.4 |
| 2 | VDF | 100% | DTBP | 15 | 25 | 1.19 | 174.3 | 0.52 | 3.4 |
| 3* | VDF | 100% | DTBP | 122.5 | 44 | 1.56 | 159.8 | s.f. | 5.4 |
| 4 | ET TFE | 45.8% 54.2% | KPS | 5 | 10 | 0.54 | 285.3 | s.f. | — |
| 5 | ET TFE | 48.6% 51.4% | DTBP | 10 | 15 | 0.23 | 292.1 | s.f. | — |
| 6 | ET TFE | 45.3% 54.7% | acetone | 10 | 15 | 0.045 | 291.5 | s.f. | — |
| 7* | ET TFE | 45.3% 54.7% | APS | 75 | 22 | 0.54 | 263.7 | s.f. | — |
| 8 | TFE FPVE | 99.04% 0.96% | KPS | 15 | 10 | 1.49 | 316.0 | s.f. | — |
| 9 | VDF HFP | 79.8% 20.2% | APS | 15 | 10 | 1.16 | $T_g = -29.4°$ C. $M_w = 9 \cdot 10^5$ | | |
| 10* | VDF HFP | 80.0% 20.0% | APS | 85 | 11 | 6.8 | $T_g = -23.0°$ C. $M_w = 4 \cdot 10^5$ | | | s.f.: scarce fluidity
*comparative examples radiation source is inactivated and the reaction is immediately stopped.

8. A process for (co)polymerizing at least one fluorinated olefinic monomer, optionally in association with at least one non-fluorinated olefin, consisting essentially of (co) polymerizing said monomer(s) in an aqueous emulsion containing a surfactant and in the presence of a radical photoinitiator selected from the group consisting of inorganic peroxides, organic peroxides, ketones, dialkylsulphides, transition metal complexes; and halogenated organic compounds, and in the presence of a radiation ranging from ultraviolet to visible and having a wavelength ranging from 220 nm to 600 nm wherein organic solvents and hazardous initiators are absent, wherein the reaction temperature is from −20° C. to +100° C., and wherein the reaction pressure is from 3 to 50 bar.

9. The process of claim 8, wherein the ketones are selected from di- or polyketones.

10. The process of claim 8, wherein the organic halogenated compound is polyhalogenated.

11. A process for (co)polymerizing at least one fluorinated olefinic monomer, optionally in association with at least one non-fluorinated olefin, consisting of (co)polymerizing said monomer(s) in an aqueous emulsion containing a surfactant and in the presence of a radical photoinitiator selected from the group consisting of inorganic peroxides, organic peroxides, ketones, dialkylsulphides, transition metal complexes; and halogenated organic compounds, and in the presence of a radiation ranging from ultraviolet to visible and having a wavelength ranging from 220 nm to 600 nm wherein organic solvents and hazardous initiators are absent, wherein the reaction temperature is from −20° C. to +100° C., and wherein the reaction pressure is from 3 to 50 bars.

12. The process of claim 1, wherein the ketones are selected from di- or polyketones.

13. The process of claim 11, wherein the organic halogenated compound is polyhalogenated.

14. A process for (co)polymerizing at least one fluorinated olefinic monomer, optionally in association with at least one non-fluorinated olefin, consisting essentially of (co) polymerizing said monomer(s) in an aqueous emulsion in the presence of a radical photoinitiator selected from the group consisting of potassium persulphate; diterbutylperoxide; acetone and ammonium persulphate; and in the presence of a radiation ranging from ultraviolet to visible and having a wavelength ranging from 220 nm to 600 nm, wherein the reaction temperature is from −10° C. to +40° C., and wherein the reaction pressure is from 10 to 20 bar.

15. The process of claim 14, wherein perfluoinated olefinic monomers with non-fluornated lolefins are coplymerized.

16. Process according to claim 14, wherein the reaction is carried out in the presence of emulsions or microemulsions of perfluoropolyoxyalkylenes or fluoropolyoxyalkylenes having hydrogen-containing end-groups and/or hydrogen-containing repetitive units.

17. Process according to claim 14 wherein polymerizing is in the presence of a surfactant(s) having the formula:

$$R_fX^-M^+$$

wherein $R_f$=(per)fluoroalkyl chain $C_5$–$C_{16}$ or (per) fluoropolyoxyalklene chain:
X$^-$=—COO$^-$ or —SO$_3^-$: and
M$^+$=H$^+$, NH$_4^+$ or alkali metal ion.

18. Process according to claim 14 wherein polymerization is in the presence of a surfactant selected from the group consisting of ammonium perfuoro-octanoate and (per) fluoropolyoxyalkylenes end-capped with one or more carboxyl groups.

19. A process for (co)polymerizing at least one fluorinated olefinic monomer, optionally in association with at least one non-fluorinated olefin, consisting essentially of (co) polymerizing said monomer(s) in an aqueous emulsion containing a surfactant and in the presence of a radical photoinitiator thermally stable at polymerization temperature, selected from the group consisting of dialkylperoxides, acylperoxides, peroxycarbonates, peroxyesters, inorganic peroxides, dialkylsulphides, and in the presence of a radiation ranging from ultraviolet to visible having a wavelength ranging from 220 nm to 600 nm.

20. The process according to claim 19, wherein the radical photoinitiator is an inorganic peroxide selected from the group consisting of alkali metal persulphate and ammonium persulphate.

21. The process according to claim 19, wherein the radical photoinitiator is diterbutylperoxide.

22. The process according to claim 19, wherein the reaction temperature is from −20° C. to +100° C.

23. The process according to claim 19, wherein the reaction temperature is from −10° C. to +40° C.

24. The process according to claim 19, wherein the reaction pressure is from 3 to 50 bar.

25. The process according to claim 24, wherein the reaction pressure is from 10 to 20 bar.

26. The process according to claim 19, wherein the fluorinated olefinic monomers are selected from the group consisting of $C_2$–$C_8$ perfluoroolefins; $C_2$–$C_8$ chloro- and/or bromo-fluoroolefins; perfluorodioxols; perfluorovinylethers $CF_2$=CFOX, where X is a C1–C6 perfluoroalkyl or a $C_1$–$C_9$ perfluoro-oxyalkyl having at least one ether group.

27. The process according to claim 19, wherein the non-fluorinated olefins have from 2 to 8 carbon atoms.

28. The process according to claim 19, wherein the reaction is carried out in the presence of emulsions or microemulsions of perfluoropoly oxyalkylenes or fluoropolyoxyalkylenes having hydrogen-containing end-groups and/or hydrogen-containing repetitive units.

29. The process according to claim 19, wherein hydrogen-containing fluorinated monomers are copolymerized.

30. The process according to claim 19, wherein perfluorinated olefinic monomers with non-fluorinated olefins are copolymerized.

31. The process according to claim 19, wherein the radical photoinitiators are selected from the group consisting of diacetylperoxide, bis(4-terbutylcyclohexyl) peroxydicarbonate and terbutylperoxisobutyrate.

32. The process according to claim 19, wherein the dialkylsulphide is dimethylsulphide.

33. The process according to claim 19, wherein polymerization is carried out in the presence of a surfactant(s) having the formula:

$$R_fX^-M^+$$

wherein $R_f$=(per)fluoroalkyl chain C5–C16 or (per) fluoropolyoxyalkylene chain
X=—COO$^-$ or —SO$_3^-$
M$^+$=H$^+$, NH$_4^+$ or alkali metal ion.

34. The process according to claim 19, wherein polymerization is carried out in the presence of a surfactant selected from the group consisting of ammonium perfluoro-octanoate and (per)fluoropolyoxyalkylenes end-capped with at least one carboxyl group.

35. A process for (co)polymerizing at least one fluorinated olefinic monomer, optionally in association, with at least one non-fluorinated olefin, consisting essentially of (co) polymerizing said monomer(s) in an aqueous emulsion in the presence of a radical photoinitiator thermally stable at polymerization temperature, selected from the group consisting of inorganic peroxides, organic peroxides and acetone, in the presence of a radiation ranging from ultraviolet to visible having a wavelength ranging from 220 nm to 600 nm and in the presence of a surfactant(s) having the formula:

$$R_f X^- M^+$$

wherein $R_f$=(per)fluoroalkyl chain C5–C16 or (per)fluoropolyoxyalkylene chain
$X^-$=COO$^-$ or SO$^-$
$M^+$=—H$^+$, NH$_4^+$, or alkali metal ion.

36. Process according to claim 35 wherein the radical photoinitiator is an inorganic peroxide selected from the group consisting of alkali metal persulphate and ammonium persulphate.

37. Process according to claim 35, wherein the radical photoinitiator is diterbutylperoxide.

38. Process according to claim 35, wherein the reaction is carried out in the presence of emulsions or microemulsions of perfluoropolyoxyalkylenes or fluoropolyoxyalkylenes having hydrogen-containing end-groups and/or hydrogen containing repetitive units.

39. Process according to claim 35 wherein hydrogen containing fluorinated monomers are copolymerized.

* * * * *